UNITED STATES PATENT OFFICE.

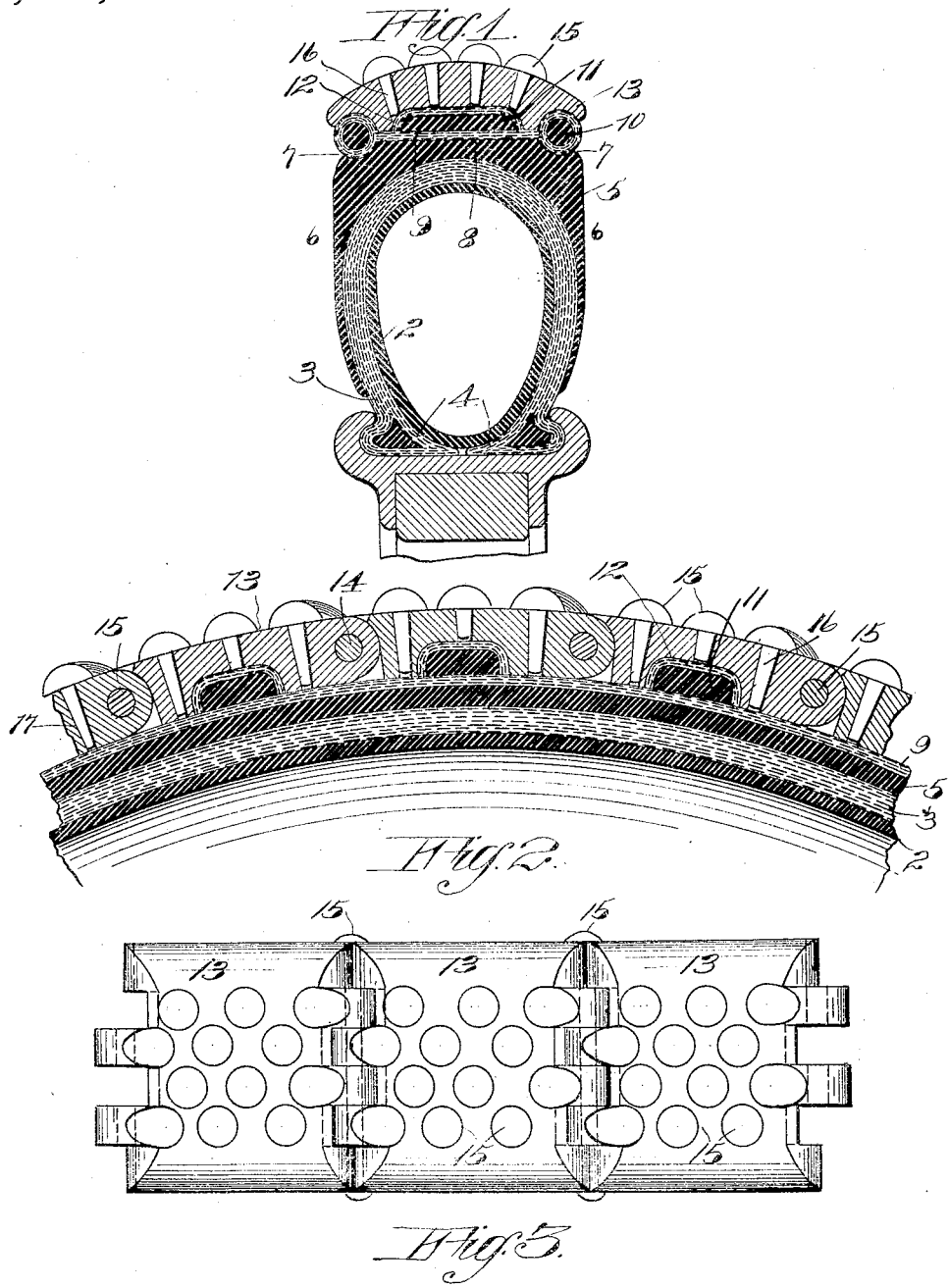

MARCELLINO TOSO, OF SAN BRUNO, CALIFORNIA, ASSIGNOR OF FORTY ONE-HUNDREDTHS TO PAUL H. PATTERSON, OF SAN FRANCISCO, CALIFORNIA.

TIRE.

1,038,235.  Specification of Letters Patent.  Patented Sept. 10, 1912.

Application filed August 29, 1911. Serial No. 646,569.

*To all whom it may concern:*

Be it known that I, MARCELLINO TOSO, a subject of the King of Italy, residing at San Bruno, in the county of San Mateo and State of California, have invented new and useful Improvements in Tires, of which the following is a specification.

This invention relates to vehicle tires, and particularly to a pneumatic tire and protecting means therefor.

The object of the present invention is to provide a very substantial, durable and practical pneumatic tire involving a body portion adapted to be inflated and which is surrounded by a removable belt or armor formed of a plurality of interchangeable, removable and renewable links; and to provide a wearing surface formed of a plurality of projecting pins adapted to contact with and engage the roadbed to aid in the traction of the tire.

The invention consists of the parts and the construction and combination of parts, as hereinafter more fully described and claimed, having reference to the accompanying drawings, in which—

Figure 1 is a transverse section through the tire. Fig. 2 is a partial longitudinal section through the tire. Fig. 3 is a plan view of a portion of the tire.

The present embodiment of my invention comprises an inflatable inner tube 2 surrounded by a suitable form of casing 3, which may be made of fabric, or rubber, or a composition of the two, and which has separable clencher edges 4 for engagement with suitable rims of the vehicle wheel. The upper portion of the tire casing 3 is built up with a considerable thickness of rubber or other appropriate material at 5, having substantially straight side surfaces 6 which terminate on each side of the tire in concaved depressions 7; the extreme periphery of the casing being formed substantially flat, as indicated at 8. The periphery of the casing is shown as encompassed in an annular fabric or other suitable material, forming a belt 9 and having ring-like cushion members 10 on each side of the tire which are snugly embraced in tubular flanges formed integral with the belt body 9. At suitable intervals on the exterior of the belt 9 of the tire there is provided a series of spurs or projections 11, which extend transversely across the tire cushion 5 and which are filled with a soft or resilient material, as rubber, at 11, which cushion sections 11 are inclosed in the fabric walls 12 formed integral with the body of the belt 9.

The tread or road-engaging portion of the tire is composed of a continuous, flexible, endless band formed of a number of metallic or other suitable links 13 extending peripherally around the tire and having suitable hinge-like joints secured flexibly by a pivot member 14, the outer ends of which are securely fastened to prevent longitudinal movement, as by riveting or otherwise. The links 13 may be made of suitable length and width to give the desired exterior or interior contour to produce the most advantageous results; as shown in Fig. 1, the transverse contour of the links 13 is such as to be somewhat convex, and from the convex surface of the several links there projects a number of removable traction pins, or equivalent devices, 15, the heads of which are of such proportion as to form an almost continuous traction surface for the tire. The inner ends of the traction pins 15 may be tapered, as at 16, so as to be driven firmly into suitable openings 17 formed for their reception in the chain links or plugs 13. Each of the links 13 is concaved on its under surface, so as to receive the projecting portions 12 of the belt 9 of the tire, and thereby all circumferential or transverse slippage or movement of the chain member is positively prevented relative to the main portion of the tire. The wearing pins 15 may be secured in place by screwing or otherwise, as desired, but by forming the portions 16 with a slight taper they are readily driven out of the plugs 13 when the head portions 15 have been worn down.

The tire portion 3 may be made substantially solid, if desired, and the inflatable tube omitted, but it is advantageous to have the transverse width of the chain links 13 equal to or slightly greater than the width of the cushioning body 5, so as to protect the latter from abrasion with gravel or projections in the roadway.

Having thus described my invention, what I claim and desire to secure by Letters Patent is—

1. A tire comprising a suitably shaped body portion having concaved depressions at the sides near the periphery, an annular fabric of belt-like form encompassing the periphery of said body and fashioned with tubular flanges at the side edges, and ring-like cushion members inclosed by the tubular flanges of said belt, and fitting said concaved depressions, said belt having spaced projections on its outer surface extending across the same.

2. A tire comprising a suitably shaped body portion having concaved depressions at the sides near the periphery, an annular fabric of belt-like form encompassing the periphery of said body and fashioned with tubular flanges at the side edges, and ring-like cushion members inclosed by the tubular flanges of said belt, and fitting said concaved depressions, said belt having spaced projections on its outer surface extending across the same, and having spaced fabric walls to inclose the projections.

3. A tire comprising a suitably shaped body portion having concaved depressions at the sides near the periphery, an annular fabric of belt-like form encompassing the periphery of said body and fashioned with tubular flanges at the side edges, and ring-like cushion members inclosed by the tubular flanges of said belt, and fitting said concaved depressions, said belt having spaced projections on its outer surface extending across the same and having spaced fabric walls to inclose the projections, and a link belt encompassing the fabric belt the under surfaces of the links of said belt being concaved and inclosing said cushion members.

In testimony whereof I have hereunto set my hand in the presence of two subscribing witnesses.

MARCELLINO TOSO.

Witnesses:
 JOHN H. HERRING,
 CHARLES EDELMAN.

---

Copies of this patent may be obtained for five cents each, by addressing the "Commissioner of Patents, Washington, D. C."